United States Patent [19]

Ohnuma et al.

[11] Patent Number: 5,026,737
[45] Date of Patent: Jun. 25, 1991

[54] PROCESS FOR THE PRODUCTION OF URETHANE-MODIFIED POLYISOCYANURATE FOAM

[75] Inventors: Yoshiyuki Ohnuma; Norio Tanaka, both of Ashikaga, Japan

[73] Assignee: Achilles Corporation, Tokyo, Japan

[21] Appl. No.: 440,210

[22] Filed: Nov. 22, 1989

[30] Foreign Application Priority Data

Nov. 24, 1988 [JP] Japan .................................. 63-296947

[51] Int. Cl.[5] .............................................. C08G 18/14
[52] U.S. Cl. ......................................................... 521/78
[58] Field of Search ............................................ 521/78

[56] References Cited

U.S. PATENT DOCUMENTS 3,989,651 11/1976 Lockwood et al. ............... 427/244
4,710,521 12/1987 Soukup et al. ..................... 521/118

*Primary Examiner*—Maurice J. Welsh
*Attorney, Agent, or Firm*—Sherman and Shalloway

[57] ABSTRACT

A process for producing a urethane-modified polyisocyanurate foam comprises mixing a polyisocyanate component, a polyl component containing an aromatic polyester polyol, a catalyst, a foaming agent, a surfactant and other additives under high pressure in a mixing head and then spraying the resultant mixture to expand the foaming ingredient therein. The process uses, as the catalyst, at least three compounds of N,N',N''-tris(dimethylaminopropyl)-S-hexahydrotriazine, an alkali metal carboxylate and a lead compound in combination.

13 Claims, No Drawings

PROCESS FOR THE PRODUCTION OF URETHANE-MODIFIED POLYISOCYANURATE FOAM

BACKGROUND OF THE INVENTION (1) Field of the Invention

This invention relates to a process for the production of urethane-modified polyisocyanurate foams excellent in flame retardance and adhesion property.

(2) Description of the Related Art

It is known to produce a polyisocyanurate foam by reacting a polyisocyanate in the presence of trimer catalysts. However, the polyisocyanurate foam has extremely high brittleness, so it is generally converted into a urethane-modified polyisocyanurate foam, in which urethane linkages have been introduced by making use of a polyol.

Upon the production of a urethane-modified polyisocyanurate foam, a polyisocyanate component and a polyol component are generally formulated in such a proportion that an NCO/OH equivalent ratio is at least about 2.0. Effects improving the brittleness of the polyisocyanate foam became greater as the amount of the polyol to be used increases. The increase of its amount is accompanied by a problem of lowered flame retardance on the contrary.

On the other hand, it is known to permit the improvement of the brittleness without lowering the flame retardance when an aromatic polyester polyol is employed as a polyol component because there is little potential problem that the flame retardance is degraded even when a relatively large amount of the polyol is used. For this reason, the urethane-modified polyisocyanurate foam making use of the aromatic polyester polyol as the polyol component has been used widely in thermal insulating materials such as so-called continuous laminate boards obtained by expanding it to unite with a surface material such as a plasterboard. When the urethane-modified polyisocyanurate foam is expanded on a surface material so as to unite them like the continuous laminate board or the like, the surface material is generally heated to permit good adhesion of the foam to the surface material and to complete the trimerization of the polyisocyanate component. It is however difficult to control the surface temperature of a substrate (a material intended to be subjected to spray foaming) in the spray application in which a polyisocyanate component is mixed with a polyol component containing a trimer catalyst and other additives, etc. in situ in the construction field of a building, or the like and the resulting mixture is sprayed on a surface material such as a wall material or a ceiling material to expand the foaming ingredient therein, thereby uniting them. In addition, when spray foaming is conducted so as to give a foam having a relatively thin thickness, the heat of reaction in a foamed layer is absorbed in the substrate and the temperature of the foamed layer hence tends to be lowered, whereby the degree of completion of the trimerization becomes lower. It is therefore difficult to sufficiently exhibit the flame retardance characteristic of the urethane-modified polyisocyanurate foam. Furthermore, the trimer reaction is later than the urethane reaction when conducting the expansion at a low temperature, thereby undergoing two-stage expansion. Therefore, creep occurs right before the curing of the foam and at the same time its curing becomes slow. The adhesion property of the foam to the substrate is hence degraded to a great extent. For this reason, there has also been a problem that impossibility is encountered on the spray foaming of a urethane-modified polyisocyanurate foam on the surface of a substrate as the temperature of the substrate is lowered to 10° C. or lower in a construction field or the like in winter.

SUMMARY OF THE INVENTION

The present inventors have carried out an extensive investigation with a view toward solving the above-described problems. As a result, there has been developed a process for producing an excellent urethane-modified polyisocyanurate foam having superb adhesion property at low temperature and passing Grade 3 incombustibility in the test in accordance with JIS A 1321.

Namely, an object of this invention is to provide a process for the production of urethane-modified polyisocyanurate foams exhibiting excellent reactivity even at a temperature as low as 10° C. or less, and having a high degree of completion of the trimerization to permit the provision of superb flame retardance and at the same time undergoing no two-stage expansion to permit the provision of excellent adhesion property even when the thickness of a foam sprayed is relatively thin and/or the temperature of a material intended to be subjected to spray foaming is extremely as low as 0° C. in particular.

The present inventors have found that foams excellent in flame retardance and adhesion property even at low temperature can be formed by using, as a polyol component, polyols containing an aromatic polyester polyol and employing specific catalysts in combination, leading to completion of this invention.

In one aspect of this invention, there is thus provided a process for producing a urethane-modified polyisocyanurate foam by mixing a polyisocyanate component, a polyol component containing an aromatic polyester polyol, a catalyst, a foaming agent, a surfactant and other additives under high pressure in a mixing head and then spraying the resultant mixture to expand the foaming ingredient therein, which comprises using, as the catalyst, at least three compounds of N,N',N''-tris(dimethylaminopropyl)-S-hexahydrotriazine, an alkali metal carboxylate and a lead compound in combination.

As the foaming agent, may preferably be used a foaming agent liquid at normal temperature and pressure and a foaming agent gaseous at normal temperature and pressure, which has a boiling point of 5° C. or lower. The foaming agent having a boiling point of 5° C. or lower is used in a proportion of 0.2–5 wt. % based on the total weight of the polyisocyanate component and the polyol component.

The content of the aromatic polyester polyol in the polyol component may preferably be 50–90 wt. %.

The polyisocyanate component and the polyol component may preferably be reacted in such a proportion that an NCO/OH equivalent ratio is 1.5–3.0.

The amounts of the alkali metal carboxylate and the lead compound in the catalyst may preferably be 0.3–1.5 parts by weight and 0.05–0.2 part by weight, respectively, per part weight of N,N',N''-tris-(dimethylaminopropyl)-S-hexahydrotriazine.

The proportion of the catalyst to be added may preferably be 3.0–10 wt. % of the whole weight of the components.

According to the present invention, it is possible to produce a urethane-modified polyisocyanurate foam having flame retardance passing Grade 3 incombustibility in the test in accordance with JIS A 1321 and exhibiting superb adhesion property even when a material intended to be adhered is at a temperature as low as 0° C.

In addition, it is also possible to form a foam further superb in adhesion property at low temperature by use of the froth spray process making use, as a foaming agent, of a foaming agent liquid at normal temperature and pressure and a foaming agent gaseous at normal temperature and pressure, which has a boiling point of 5° C. or lower, in specific amounts.

DETAILED DESCRIPTION OF THE INVENTION AND PREFERRED EMBODIMENTS

As the polyisocyanate component employed in this invention, polyisocyanates such as aromatic polyisocyanates and aliphatic polyisocyanates may be used either singly or in combination. However, aromatic polyisocyanates are preferred.

Exemplary aromatic polyisocyanates include polymethylene polyphenylisocyanate, diphenylmethane diisocyanate and tolylene diisocyanate. However, the aromatic polyisocyanates useful in the practice of this invention is not limited thereto.

As the polyol component employed in this invention, that containing an aromatic polyester polyol is used. As exemplary aromatic polyester polyols, may be mentioned those prepared from polyethylene terephthalate, process residues of dimethyl terephthalate, phthalic acid and the like. It is preferred that its hydroxyl number is generally 150–400 mg KOH/g or so. The amount of the aromatic polyester polyol in the polyol component is preferably 50–90 wt. % with 60–85 wt. % being particularly preferred. Any amounts less than 50 wt. % is accompanied by a difficulty of passing JIS A 1321 Grade 3 incombustibility. Any amounts exceeding 90 wt. % results in a foam deteriorated in dimensional stability. It is hence not preferred to use the aromatic polyester polyol in any amounts outside the above range.

In this invention, it is preferred to formulate the polyisocyanate component and the polyol component in such a proportion that an NCO/OH equivalent ratio is 1.5–3.0, with 1.8–2.7 being more preferred. If the NCO/OH equivalent ratio is lower than 1.5, it is difficult to pass Grade 3 incombustibility prescribed in JIS A 1321. On the other hand, if the equivalent ratios exceeds 3.0, the brittleness of the resulting foam becomes high and at the same time, creep phenomenon takes place, whereby the adhesion property of the foam is deteriorated. It is hence not preferred to formulate them in any proportions outside the above range.

In this invention, it is necessary to use at least the following three catalysts (1)–(3) in combination. One or more additional catalysts may however be used therewith.

The three catalysts useful in the practice of this invention are as follows:
(1) N,N',N"-tris(dimethylaminopropyl)-S-hexahydrotriazine;
(2) a trimer catalyst formed of an alkali metal carboxylate; and
(3) a lead compound.

As exemplary alkali metal carboxylates of these, may be mentioned potassium octoate, potassium acetate and the like. As exemplary lead compounds, may be mentioned lead octoate, lead naphthenate and the like. It is preferred from convenience of handling to use the alkali metal carboxylate in the form of a solution in a polyhydric alcohol such as diethylene glycol and propylene glycol. Similarly, it is preferable to use the lead compound in the form of a solution in mineralspirit or the like.

In order to decrease creep, provide sufficient reactivity and enhance the degree of completion of trimerization, the above three catalysts are preferably used in combination in such a proportion that the alkali metal carboxylate and the lead compound are 0.3–1.5 parts by weight and 0.05–0.2 part by weight, respectively, per part by weight of N,N',N"-tris-(dimethylaminopropyl)-S-hexahydrotriazine. Here, the parts by weight as to the alkali metal carboxylate and the lead compound are both numerical values of the catalysts alone free of any solvents.

The total amount of the three catalysts to be used is suitably 3.0–10 wt. %.

Each of the three catalysts has heretofore been used by itself upon the production of this kind of foams. However, when the catalysts are separately used, the adhesion property and flame retardance of a foam to be formed become inferior upon the production at a low temperature as has been described in the Related Art. The desired effects can be attained only by using the three catalysts in combination.

In this invention, a foaming agent liquid at normal temperature and pressure is mixed with a polyol component and/or a polyisocyanate component in advance. The polyol component and the polyisocyanate component are mixed together in a mixing head under a high pressure. The resultant mixture is then sprayed to expand the foaming ingredient therein, thereby permitting the production of a urethane-modified isocyanurate foam. Incidentally, the term "normal temperature" as used herein generally means a temperature between about 10° C. and about 30° C. Exemplary foaming agents, which are liquid at normal temperature and pressure and mixed with the polyol component and/or the polyisocyanate component in advance, include trichloromonofluoromethane, methylene chloride, water and the like.

In this invention, a froth spray process, wherein a foaming agent liquid at normal temperature and pressure and a foaming agent gaseous at normal temperature and pressure and having a boiling point of 5° C. or lower are used in combination, may also be used.

Exemplary foaming agents having a boiling point of 5° C. or lower include dichlorodifluoromethane, monochlorodifluoromethene, dichlorotetrafluoromethane and the like.

The foaming agent gaseous at normal temperature and pressure and having a boiling point of 5° C. or lower may be either incorporated in a liquid state under a high pressure into a conduit between a compressing and metering pump for the polyol component and/or the polyisocyanate component and the mixing head or directly incorporated into the mixing head.

The foaming agent having a boiling point of 5° C. or lower is used in an amount of 0.2–5 wt. %, preferably, 0.5–2 wt. % based on the total weight of the polyol component and the polyisocyanate component. These foaming agents are intended to incorporate as a primary foaming agent. If the amount to be incorporated is less than 0.2 wt. %, primary foaming will become insufficient. On the other hand, any amounts exceeding 5 wt. % result in a failure to obtain a foam smooth in its surface.

According to the froth spray process making use of a foaming agent having a boiling point of 5° C. or lower as a primary foaming agent, as the polyisocyanate component and the polyol component, which have been mixed in the mixing head, are discharged from a spray gun under normal pressure, the primary foaming agent is vaporized in a moment, whereby the foaming ingredient in the mixture is discharged in an already-foamed state from the tip of the spray gun. Since the foaming ingredient has already been expanded before it adheres to a substrate (a material intended to be subjected to spray foaming) as described above, the nature and temperature of the substrate hardly affect the foaming ingredient. In addition, even when the temperature of the substrate is low, it is possible to prevent the reduction of the degree of completion of trimerization and the creep phenomenon due to the endothermic action of the substrate because the foam initially adhered and formed on the substrate performs the role of a insulating layer between a foam formed on the primary foam by expansion (secondary expansion) with the foaming agent liquid at normal temperature and pressure and the substrate. In cooperation with the use of the above-described specific three catalysts in combination, the adhesion property at low temperatures can be improved further. In the production process of the urethane-modified polyisocyanurate foams according to this invention, it is possible to use further one or more other optional additives. In order to form a particularly good foam, it is preferable to use a silicone-based surfactant as has been used in the production of polyurethane foams. It is also possible to add one or more known additives such as flame retardant, colorant, filler and/or stabilizer.

EXAMPLES

The present invention will hereinafter be described in further detail by the following Examples. It should however be borne in mind that this invention is not necessarily limited to or by the following Examples.

EXAMPLES 1–5 AND COMPARATIVE EXAMPLES 1–7

Using, as raw ingredients, their corresponding polyisocyanate components, aromatic polyester polyols, polyether polyols, surfactants, catalysts, flame retardants and foaming agents shown in Table 1, spray foams were separately formed on slate plates of 450 mm long, 450 mm wide and 6 mm thick at 0° C. or 10° C. by a "Gusmer Model FF Unit" (a spray foaming machine manufactured by Gusmer Corporation) to give a thickness of 25 mm. Temperatures of each polyisocyanate component and polyol component were both at 45° C. upon mixing them. With respect to each of the slate plates on which urethane-modified polyisocyanurate foams has been separately formed, tests for flame retardance and physical properties were conducted. Results are shown collectively in Table 1.

TABLE 1

|  |  | Example | | | | | Comparative Example | | | | | | |
|---|---|---|---|---|---|---|---|---|---|---|---|---|---|
|  |  | 1 | 2 | 3 | 4 | 5 | 1 | 2 | 3 | 4 | 5 | 6 | 7 |
| Raw ingredients | Polyisocyanate component *1 | 176.9 | 178 | 179 | 176.9 | 178 | 175.6 | 175.5 | 179 | 177.5 | 175 | 175.6 | 175 |
|  | Aromatic polyester polyol *2 | 70 | 70 | 70 | 70 | 70 | 70 | 70 | 70 | 70 | 70 | 70 | 70 |
|  | Polyether polyol *3 | 30 | 30 | 30 | 30 | 30 | 30 | 30 | 30 | 30 | 30 | 30 | 30 |
|  | Surfactant *4 | 1 | 1 | 1 | 1 | 1 | 1 | 1 | 1 | 1 | 1 | 1 | 1 |
|  | Catalyst A *5 | 2 | 2.5 | 2.5 | 2 | 2.5 | — | 4 | 4 | — | — | — | — |
|  | Catalyst B *6 | 3.5 | 4 | 3 | 3.5 | 4 | 4 | — | — | 4 | 4 | 3.5 | 4 | 3.5 |
|  | Catalyst C *7 | — | — | 2 | — | — | — | — | — | 2 | — | — | — |
|  | Catalyst D *8 | 0.4 | 0.5 | 0.5 | 0.4 | 0.5 | 0.6 | 0.5 | — | 0.5 | 0.5 | 0.6 | 0.5 |
|  | Flame retardant *9 | 20 | 20 | 20 | 20 | 20 | 20 | 20 | 20 | 20 | 20 | 20 | 20 |
|  | Foaming agent A *10 | 50 | 50 | 50 | 50 | 50 | 50 | 50 | 50 | 50 | 50 | 50 | 50 |
|  | Foaming agent B *11 | 1 | 1 | 1 | — | — | 1 | 1 | 1 | 1 | — | — | 1 |
| NCO/OH equivalent ratio |  | 2.27 | 2.29 | 2.30 | 2.27 | 2.29 | 2.25 | 2.25 | 2.30 | 2.28 | 2.25 | 2.25 | 2.25 |
| Temperature of slate plate (°C.) |  | 10 | 0 | 0 | 10 | 0 | 0 | 0 | 0 | 0 | 10 | 0 | 10 |
| Foam properties | Creep *12 |  |  |  |  | Δ | X |  | X | X | Δ | X | Δ |
|  | Curability *13 |  |  |  |  |  |  | X | X |  |  |  |  |
|  | Foam density (kg/m³) | 31.5 | 32.3 | 32.0 | 32.0 | 32.8 | 32.4 | 32.2 | 33.0 | 32.5 | 32.5 | 33.0 | 32.0 |
|  | Adhesion strength (kg/cm²) | 2.8 | 2.4 | 2.4 | 2.8 | 2.0 | 0.3 | 0.2 | 0.2 | 0.2 | 1.3 | 0.2 | 1.5 |
|  | Flame retardance *14 |  |  |  |  |  |  | X |  |  |  |  |  |

*1 Polyisocyanate: "MDI-CR100 (trade name; polymethylene polyphenylisocyanate; product of Mitsui Toatsu Chemical, Inc.)
*2 Aromatic polyester polyol: "Chardol 336" (trade name; hydroxyl number: 235; product of Chardonol, Division of Freeman Chemical Corporation
*3 Polyether polyol: "Excenol 532SA" (trade name; hydroxyl number: 530; product of Asahi Glass Co., Ltd.)
*4 Surfactant: "F-305" (trade name; product of SHIN-ETSU Chemical Co., Ltd.)
*5 Catalyst A: "Polycat 41" (trade name N,N',N''-tris(dimethylaminopropyl)-S-hexahydrotriazine; product of Air Products and Chemicals, Inc.)
*6 Catalyst B: "PELCAT 9540" (trade name; potassium octoate in diethylene glycol, K = 15; product of Pelron Corp.)
*7 Catalyst C: "TAP30" (trade name; 2,4,6-tris(dimethylaminomethyl)phenol; product of Kayaku Noury Corporation)
*8 Catalyst D: "Pb-Oc" (trade name; lead octoate in mineral-spirit, Pb = 24%; product of Dainippon Ink and Chemicals, Inc.)
*9 Flame retardant: "Fyrol PCF" [trade name: tris(β-chloroisopropyl)-phosphate; product of Akzo Japan Limited)
*10 Foaming agent A: "R-11SS" (trade name; trichloromonofluoromethane; product of Asahi Glass Co., Ltd.)
*11 Foaming agent B: "R-12" (trade name; dichlorodifluoromethane; product of Asahi Glass Co., Ltd.)
*12 Creep: A distance of the foam creeped from the edge of each sample slate plate was measured. The occurrence of creep as determined in accordance with the following standard:
    Creep less than 10 mm

TABLE 1-continued

| | |
|---|---|
| Creep not less than 10 mm but less than 15 mm | Δ |
| Creep not less than 15 mm | X |

*13 Curability: The curability of each foam was determined in accordance with the following standard:

| | |
|---|---|
| Upon elapsed time of 1 hour after expansion, the foam surface was not sticky and did not dented even when pressing with a finger | |
| Upon elapsed time of 1 hour after expansion, the foam surface remained sticky and dented when pressing with a finger | X |

*14 Flame retardance: Each foam was tested in accordance with JIS A 1321. Its passing standard is as follows:
  (1) Temperature time area          350 or less
  (2) Fuming factor                  120 or less
  (3) Afterflame shall not exist upon elapsed time of 30 seconds or more after completion of the heating.
  (4) The exhaust temperature curve of the test result shall not exceed the reference temperature curve within 3 minutes after the start of the test.
The flame retardance of the foam was expressed in terms of   in the case of passing and X in the case of failing.

What is claimed is:

1. A process for producing a urethane-modified polyisocyanurate foam by mixing a polyisocyanate component, a polyol component containing an aromatic polyester polyol, a catalyst, a foaming agent, a surfactant and other additives under high pressure in a mixing head and then spraying the resultant mixture to expand the foaming ingredient therein, which comprises using, as the catalyst, at least three compounds of N,N',N''-tris(dimethylaminopropyl)-S-hexahydrotriazine, an alkali metal carboxylate and a lead compound in combination.

2. The process as claimed in claim 1, wherein as the foaming agent, a foaming agent liquid at normal temperature and pressure and a foaming agent gaseous at normal temperature and pressure, which has a boiling point of 5° C. or lower are used and the foaming agent having a boiling point of 5° C. or lower is used in a proportion of 0.2-5 wt. % based on the total weight of the polyisocyanate component and the polyol component.

3. The process as claimed in claim 1, wherein the content of the aromatic polyester polyol in the polyol component is 50-90 wt. %.

4. The process as claimed in claim 1, wherein the polyisocyanate component and the polyol component are reacted in such a proportion that an NCO/OH equivalent ratio is 1.5-3.0.

5. The process as claimed in claim 1, wherein the amounts of the alkali metal carboxylate and the lead compound in the catalyst are 0.3-1.5 parts by weight and 0.05-0.2 part by weight, respectively, per part by weight of N,N',N''-tris(dimethylamonopropyl)-S-hexahydrotriazine, said parts by weight as to the alkali metal carboxylate and the lead compound being both numerical values of the catalysts alone free of any solvents.

6. The process as claimed in claim 1, wherein the proportion of the catalyst to be added is 3.0-10 wt. % of the whole weight of the components.

7. The process of claim 1 wherein the step of spraying the resulting mixture is carried out at a temperature of 10° C. or less.

8. The process of claim 1 wherein the polyisocyanate componant is an aromatic polyisocyanate.

9. The process of claim 8 wherein the aromatic polyisocyanate is polymethylene polyphenylisocyanate, diphenylmethane diisocyanate or tolylene diisocyanate.

10. The process of claim 3 wherein the content of the aromatic polyester polyol in the polyol component is 60 to 85 weight percent.

11. The process of claim 4 wherein the polyisocyanate component and the polyol component are reacted in such a proportion that the NCO/OH ratio is 1.8-2.7.

12. The process of claim 1 wherein the alkali metal carboxylate is potassium octoate or potassium acetate and the lead compound is lead octoate or lead naphthenate.

13. The process of claim 5 wherein the alkali metal carboxylate is used in the form of a solution in a polyhydric alcohol and the lead compound is used in the form of a solution in mineral spirits.

* * * * *